(12) United States Patent
Mayer

(10) Patent No.: US 6,283,269 B1
(45) Date of Patent: Sep. 4, 2001

(54) VEHICLE-MOUNTED EXTENDABLE CONVEYOR HAVING VARIABLE ANGLE INFEED CONVEYOR ASSEMBLY

(75) Inventor: Martin G. Mayer, Racine, WI (US)

(73) Assignee: Putzmeister, Inc., Sturtevant, WI (US)

( * ) Notice: Subject to any disclaimer, the term of this patent is extended or adjusted under 35 U.S.C. 154(b) by 0 days.

(21) Appl. No.: 09/454,872

(22) Filed: Dec. 3, 1999

(51) Int. Cl.[7] .......................... G65G 15/26; G65G 21/10
(52) U.S. Cl. .................. 198/313; 198/314; 198/316.1; 198/317; 198/318
(58) Field of Search .................................. 198/313–318

(56) References Cited

U.S. PATENT DOCUMENTS

| | | |
|---|---|---|
| 1,204,620 | 11/1916 | Vulgamott . |
| 1,581,632 | 4/1926 | De Fries . |
| 2,538,308 | 1/1951 | Grahl ................................. 198/233 |
| 2,632,556 | 3/1953 | Alpers et al. ....................... 198/115 |
| 2,805,759 | 9/1957 | Manceau ............................. 198/90 |
| 2,888,130 | 5/1959 | Mousel ............................... 198/109 |
| 3,037,612 | 6/1962 | Matheson et al. ................ 198/120.5 |
| 3,051,295 | 8/1962 | Moy ................................... 198/115 |
| 3,154,189 | 10/1964 | O'Hanlon et al. .................... 198/91 |
| 3,598,224 | 8/1971 | Oury .................................. 198/65 |
| 3,687,276 | * 8/1972 | Pelletier ............................. 198/314 |
| 3,826,353 | 7/1974 | Greasley ............................. 198/139 |
| 4,008,797 | 2/1977 | Nelson ............................... 198/318 |
| 4,058,198 | 11/1977 | O'Neill et al. ....................... 198/313 |
| 4,523,669 | 6/1985 | Smith ................................. 198/313 |
| 4,624,357 | 11/1986 | Oury et al. .......................... 198/313 |
| 4,765,461 | * 8/1988 | Ozolins et al. ..................... 198/311 |
| 5,090,550 | 2/1992 | Axmann .............................. 198/313 |
| 5,360,097 | 11/1994 | Hibbs ................................. 198/313 |
| 5,669,562 | * 9/1997 | Smith ................................. 198/315 |

FOREIGN PATENT DOCUMENTS 643880 9/1950 (GB) .

* cited by examiner

*Primary Examiner*—Christopher P. Ellis
*Assistant Examiner*—Mark A. Deuble
(74) *Attorney, Agent, or Firm*—Andrus, Sceales, Starke & Sawall, LLP

(57) ABSTRACT

A vehicle-mounted conveyor system including an infeed conveyor assembly having a telescoping feed section including a pivotable outer portion. The feed section of the infeed conveyor assembly includes an outer portion pivotally mounted to an inner portion such that the outer portion can be positioned at an angle relative to the inner portion. The outer portion of the feed section includes a support assembly such that the outer portion can be supported on the ground in a generally horizontal orientation. The outer section includes a collapsible collection bin having a pair of hinged sidewalls and a pair of hinged end walls that can be joined to form the collection bin above the conveyor belt of the infeed conveyor assembly. The combination of the collapsible bin and horizontal outer portion of the feed section of the infeed conveyor assembly allows the conveyor system to be used in directly unloading a supply of aggregate material without the requirement of a separate hopper and additional unloading equipment.

20 Claims, 5 Drawing Sheets

VEHICLE-MOUNTED EXTENDABLE CONVEYOR HAVING VARIABLE ANGLE INFEED CONVEYOR ASSEMBLY

BACKGROUND OF THE INVENTION

The present invention relates to a self-propelled, vehicle-mounted conveyor system used to place concrete or other aggregate materials in a desired location. More specifically, the present invention is a vehicle-mounted conveyor system that includes an infeed conveyor assembly having an extendable feed section including an outer portion that is pivotable relative to a base portion such that the infeed conveyor assembly can be used to unload aggregate materials directly from a supply source.

Vehicle-mounted, extendable concrete conveyor systems, such as shown in U.S. Pat. No. 4,624,357, have been in wide use for some time. Vehicle-mounted conveyor systems of this type have been found to be very useful because the concrete, or other aggregate material, can be transferred to a location at the work site that may be located a considerable distance from the supply of material. The vehicle-mounted conveyor system has proven to be very useful since the entire conveyor system can be quickly and easily moved by simply moving the vehicle on which the conveyor system is mounted. The conveyor system not only can be moved around the work site, but also includes a discharge conveyor assembly having a telescoping boom that can be extended and retracted, rotated about a vertical axis, and elevated to considerable heights. The vehicle-mounted conveyor system identified above can be moved from a working position to a transporting position and the entire vehicle and conveyor system can be transported over highways to travel between various work sites.

The extendable discharge conveyor assembly of the conveyor system includes a moving discharge conveyor belt that is fed by a second, infeed conveyor assembly. One end of the infeed conveyor assembly is positioned to receive a supply of concrete from a ready-mix truck or other type of delivery means. The infeed conveyor assembly transfers the material onto the discharge conveyor belt, which in turn transports the material to the desired point at the work site.

In currently available vehicle-mounted conveyor systems, the infeed conveyor assembly has a fixed length and is mounted to a main turret on the vehicle body. The infeed conveyor assembly is rotatable about the main turret such that the infeed conveyor assembly can be positioned at various locations around the vehicle. In addition, the entire infeed conveyor assembly is typically pivotally mounted to the main turret about a horizontal axis such that the outermost end of the infeed conveyor assembly can be raised and lowered as desired. For example, the entire infeed conveyor assembly can be raised above the vehicle and stored in a transporting position above the vehicle cab. Since the maximum length for the vehicle, including the discharge conveyor assembly and the infeed conveyor assembly in their transporting position, should not exceed 40 feet, the overall, fixed length of the infeed conveyor assembly is typically 40 feet.

The self-propelled, vehicle-mounted conveyor system is often used to transport aggregate materials, such as sand or loose gravel, supplied by a dump truck. The width of a conventional dump truck is approximately 102 inches and unloads material across its full width at a height not more than 30 inches from the ground. The above-described fixed length infeed conveyor assembly cannot be used alone to unload a dump truck, since the change in height of the infeed conveyor over the width of the dump truck exceeds the unloading height of the dump truck. For example, when the infeed conveyor assembly is at an incline of approximately 20°, the change in height of the infeed conveyor assembly is approximately 37 inches over the 102 inch width of the dump truck body. Therefore, if a dump truck backs up directly to the conventional fixed length infeed conveyor assembly, the height of the infeed conveyor assembly will exceed the loading height for the dump truck along a portion of the width of the dump truck body.

To overcome the unloading problems identified above, the conventional fixed length infeed conveyor assembly is positioned beneath an independent hopper that receives the supply of aggregate material from a front end loader or additional conveyor and feeds the aggregate material onto the endless conveyor belt contained in the infeed conveyor assembly. The hopper is required to accumulate the supply of aggregate material as the material is fed from the supply source and position the material above the inclined conveyor belt contained in the infeed conveyor assembly.

Without the hopper, the supply of aggregate material from the supply source, such as a cement truck, falls off the inclined conveyor and is not adequately conveyed to the discharge conveyor assembly. During transportation of the vehicle including the conveyor assembly, the hopper must be stored on the vehicle separate from the infeed conveyor assembly.

Therefore, it is a primary object of the present invention to provide a vehicle-mounted conveyor system in which the infeed conveyor assembly allows a dump truck to unload in full width directly onto the full width of the infeed conveyor assembly without any additional special equipment or machinery. Further, it is an object of the present invention to provide a vehicle-mounted conveyor system in which the infeed conveyor assembly includes an a feed section that can be pivoted about a horizontal axis to provide a horizontal feed surface to receive a supply of aggregate material from a supply source. It is a further object of the invention to provide a locking assembly between an outer portion and an inner portion of the feed section such that the outer portion can be secured into a locked transporting position in which the outer portion is generally parallel to the longitudinal axis of the infeed conveyor assembly. Further, it is an object of the present invention to provide an endless conveyor belt that extends between the outer portion and the inner portion of the feed section and allows the outer portion to be pivoted and positioned at an angle relative to the inner portion.

Additionally, it is an object of the present invention to provide a collapsible collection bin formed on the feed section of the infeed conveyor assembly such that the collection bin can be assembled when the outer portion of the feed section is positioned at an angle relative to the longitudinal axis of the infeed conveyor assembly. Further, it is an object of the invention to provide a support assembly contained on the outer portion of the feed section to support the outer portion on the ground adjacent to the supply of aggregate material when the outer portion is positioned at an angle relative to the longitudinal axis of the infeed conveyor assembly.

SUMMARY OF THE INVENTION

The present invention is a vehicle-mounted conveyor system for moving concrete and other materials from a supply source to a desired location. The conveyor system of the present invention includes an infeed conveyor assembly rotatably mounted to the vehicle to transport the aggregate material from the supply source to a discharge conveyor assembly also mounted to the vehicle. The infeed conveyor assembly includes a base section mounted to a main turret on the vehicle. The base section of the infeed conveyor assembly extends along a longitudinal axis and is pivotably movable about a horizontal axis. Additionally, the base section of the infeed conveyor assembly is rotatable about with the main turret such that the infeed conveyor assembly can be moved around the vehicle body.

The infeed conveyor assembly further includes a feed section that is extendable relative to the base section. Movement of the feed section into and out of the base section allows the overall length of the infeed conveyor assembly to be adjusted such that the infeed conveyor assembly can receive the supply of aggregate material from multiple locations around the vehicle.

The feed section of the infeed conveyor assembly consists of an inner portion and an outer portion. The outer portion of the feed section is pivotally mounted to the inner section by a pair of pivot pins. Both the inner portion and the outer portion of the feed section include a locking flange having an access hole sized to receive a locking member. When the outer section and the inner section are aligned along the longitudinal axis of the infeed conveyor assembly, the locking member can be inserted into the aligned access holes formed in the locking flanges to secure the feed section in a locked, transporting position. When in the locked position, the infeed conveyor assembly can be used in a conventional manner with a cement mixer truck.

The locking member positioned between the inner portion and outer portion of the feed section can be removed and the outer portion pivoted relative to the inner portion. The outer portion can be pivoted about the inner portion such that the outer portion can be positioned at an angle relative to the longitudinal axis of the infeed conveyor assembly. The outer portion of the feed section preferably includes a support assembly that contacts the ground and supports the outer portion. Preferably, the outer portion is supported by the support assembly at a generally horizontal orientation spaced slightly above the ground. When the outer portion is in a horizontal, operating position, the inner portion of the feed section extends upward at an angle relative to the outer portion.

The outer portion of the feed section includes a collapsible collection bin that can be extended to an operating position. When the collection bin is in its operating position, a pair of spaced end walls and a pair of spaced sidewalls define the collection bin. The collection bin accumulates the supply of aggregate material above the endless conveyor belt contained in the feed section.

The endless conveyor belt contained in the feed section extends along the combined length of the outer portion and the inner portion and is flexible enough to allow the outer portion to pivot relative to the inner portion.

The combination of the collapsible collection bin and the pivoting movement of the outer portion relative to the inner portion of the feed section allows the infeed conveyor assembly to directly receive the supply of aggregate material from a supply source with a low discharge, such as a dump truck. The infeed conveyor assembly of the present invention eliminates the need for a separate apparatus or machine to accumulate and feed the aggregate material onto the infeed conveyor assembly. The elimination of the separate hopper reduces the amount of equipment required to unload aggregate material from a dump truck.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
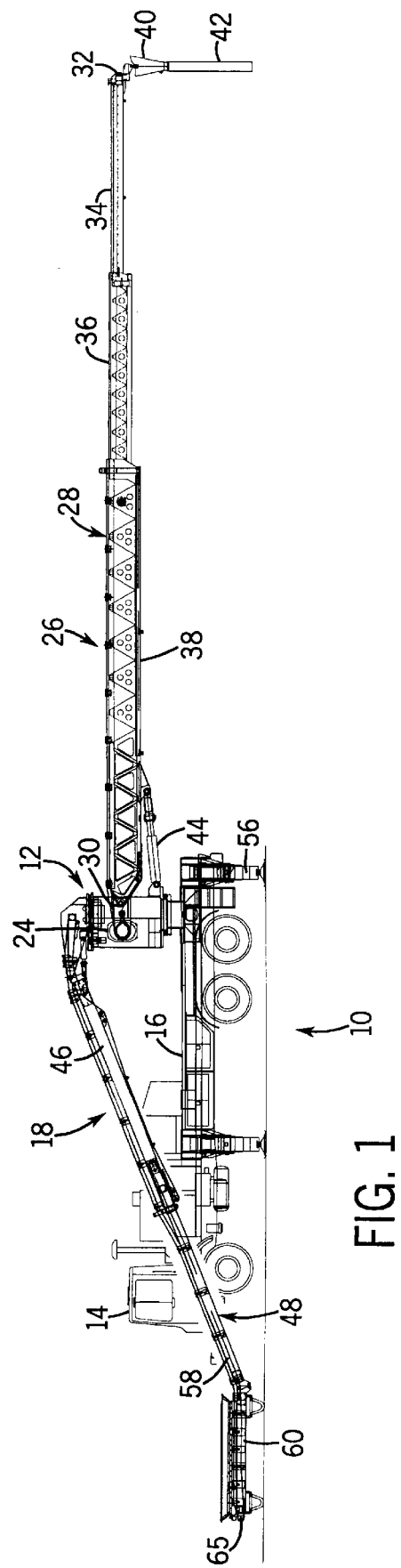
FIG. 1 is a side elevation view of a self-propelled vehicle including a vehicle-mounted conveyor system constructed in accordance with the present invention.
Figure 2:
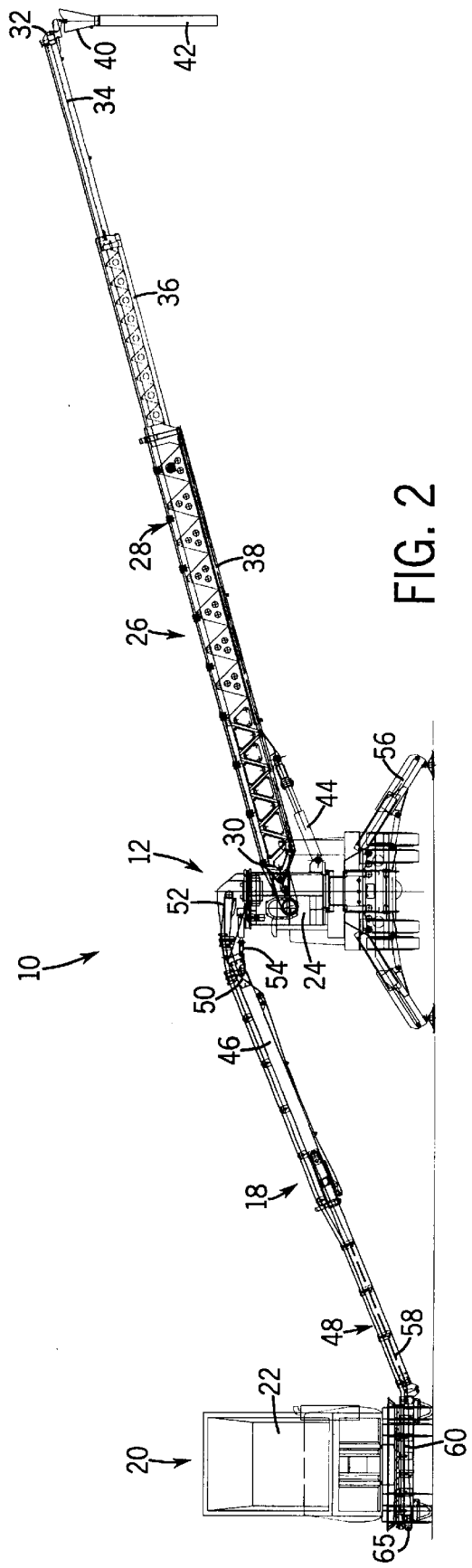
FIG. 2 is a back plan view of the vehicle-mounted conveyor system showing the infeed conveyor assembly, including a pivotable outer portion, receiving a supply of aggregate material from a supply source.

A self-propelled vehicle 10 of the present invention including a vehicle-mounted conveyor system 12 for transporting an aggregate material, such as concrete, is shown in its operating position in FIGS. 1 and 2. The vehicle 10 includes conventional cab 14 and a rear platform 16 that supports the conveyor system 12.

The vehicle 10 is of a size and weight such that it does not exceed the legal dimensional limits for over the highway travel.

The conveyor system 12 includes an infeed conveyor assembly 18 that receives the supply of aggregate material, such as concrete, from a supply source 20, such as the dump truck 22 shown in FIG. 2. The infeed conveyor assembly 18 transports the aggregate material upward along an endless infeed conveyor belt. The infeed conveyor assembly 18 is rotatable about the vehicle 10 such that the infeed conveyor assembly 18 can receive the supply of aggregate material at various locations around the vehicle 10.

The conveyor system 12 includes a main turret 24 that is rotatably mounted to the rear platform 16 of the vehicle 10. The infeed conveyor assembly 18 can either be freely movable relative to the main turret 24, or can include its own powered rotational drive mechanism, such as that illustrated in copending patent application Ser. No. 09/324,314 filed on Jun. 2, 1999.

A discharge conveyor assembly 26 is pivotally mounted to the main turret 24 about a horizontal pivot axis and also rotates about the vehicle along with the main turret 24. Specifically, the discharge conveyor assembly 26 includes a telescoping boom 28 having its base end 30 pivotally mounted in a cantilever manner to the main turret 24. The outermost, discharge end 32 of the telescoping boom 28 is contained on a tip section 34 that is extendable into and out of an intermediate section 36, which in turn is extendable into and out of a base section 38. Extension of the tip section 34 and the intermediate section 36 into and out of the base section 38 is controlled by vehicle-mounted or remote controls.

The tip section 34, intermediate section 36 and base section 38 all include one endless belt that transports the aggregate material from the base end 30 to the discharge end 32 on the telescoping boom 28. The supply of aggregate material leaving the discharge end 32 is fed into a tremie 40 joined to an elephant trunk 42. The tremie 40 and elephant trunk 42 allow the aggregate material to be deposited at a desired location at the work site.

In addition to being rotatable along with the main turret 24, the telescoping boom 28 of the discharge conveyor assembly 26 can be raised and lowered about horizontal pivot axis by a hydraulic lift cylinder 44 positioned between the main turret 24 and the base section 38 of the telescoping boom 28. The supply of hydraulic fluid to the lift cylinder 44 can be controlled either by vehicle-mounted controls (not shown) or by a remote control unit that allows the user to raise and lower the discharge conveyor assembly 26 from a remote location. In the preferred embodiment of the invention, the discharge conveyor assembly 26 can be lowered approximately 15° below horizontal and raised approximately 30° above horizontal.

Additionally, the speed of the discharge conveyor belts contained in the tie section 34, intermediate section 36 and base section 38 of the telescoping boom 28 can also be controlled by vehicle-mounted controls or via a remote control unit.

Referring now to FIGS. 1 and 2, the infeed conveyor assembly 18 includes a base section 46 and a feed section 48. The base section 46 extends along a longitudinal axis and has its inner end 50 pivotally attached to a secondary turret 52. The base section 46, and thus the entire infeed conveyor assembly 18, can be raised and lowered about a horizontal pivot axis by a hydraulic lift cylinder 54 connected between the main turret 24 and the base section 46. The supply of hydraulic fluid to the lift cylinder 54 can be controlled by either vehicle-mounted controls (not shown) or by a remote control unit that allows the user to raise and lower the infeed conveyor assembly 18 from a remote location.

The base section 46 extends along a longitudinal axis and is rotatable relative to the main turret 24. The feed section 48 is telescopingly movable relative to the base section 46 such that the overall length of the infeed conveyor assembly 18 can be selectively adjusted by extending or retracting the feed section 48 relative to the base section 46. The extension and retraction of the feed section 48 allows the retracted length of the infeed conveyor assembly 18 to remain under 40 feet while also permitting the infeed conveyor assembly 18 to unload from a supply source at an angle less than 30°. The combination of the rotation of the infeed conveyor assembly 18 relative to the main turret 24, the ability to raise and lower the infeed conveyor assembly 18 about the horizontal pivot axis and the extension of the feed section 48 relative to the base section 46 allows the infeed conveyor assembly 18 to be positioned at numerous locations relative to the stationary vehicle 10 such that the conveyor system 12 can receive the supply of aggregate material from various locations at the work site.

Figure 3:
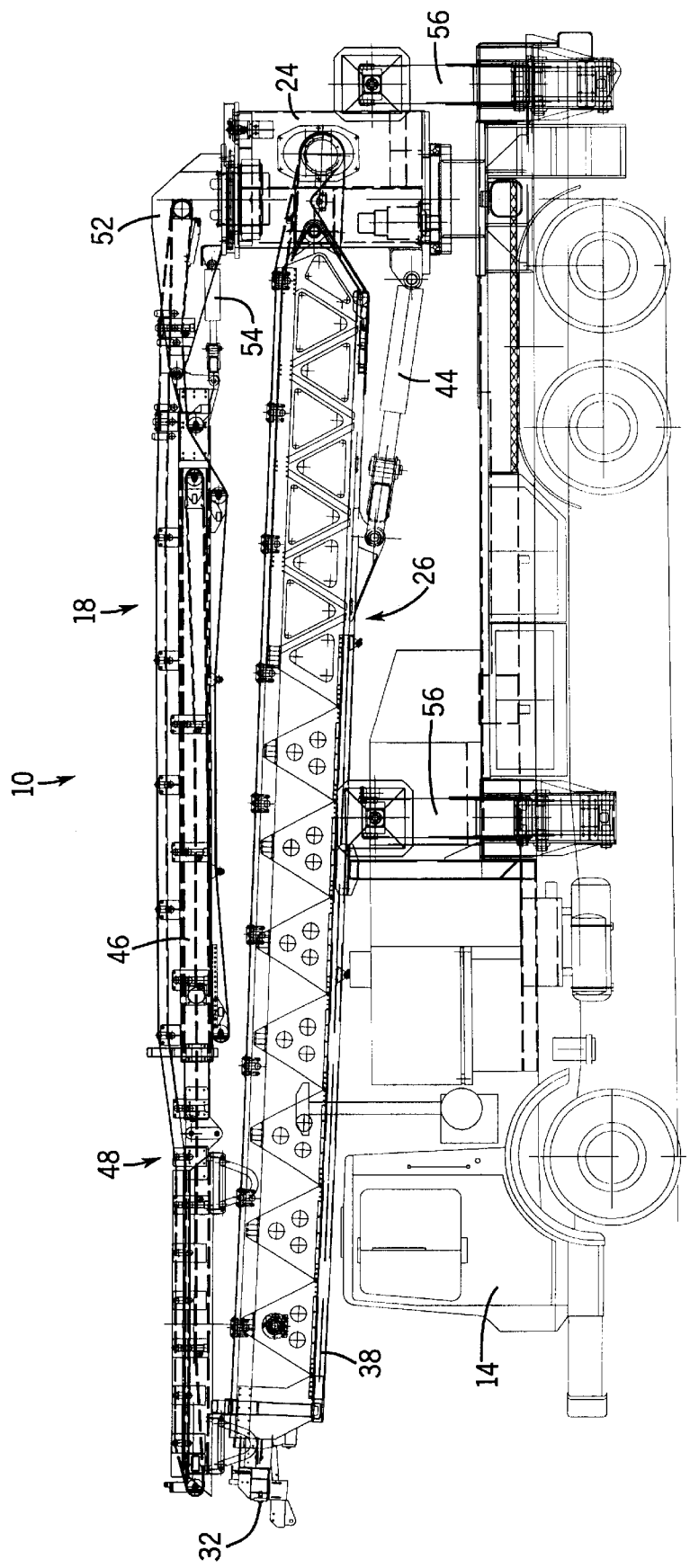
FIG. 3 is a side elevation view of the self-propelled vehicle illustrating the vehicle-mounted conveyor system in its transport position.

Referring now to FIG. 3, thereshown is the vehicle 10, including the conveyor system 12, in its fully retracted, transport position. In the transport position, the tip section 34 and intermediate section 36 of the telescoping boom 28 are nested inside the base section 38 and supported above the vehicle cab 14.

In addition to the discharge conveyor assembly 26, the infeed conveyor assembly 18 is also movable to a transport position as shown in FIG. 3. In the transport position, a substantial portion of the feed section 48 is nested within the base section 46 such that the infeed conveyor assembly 18 does not extend any further from the front of the vehicle 10 than the discharge conveyor assembly 26. Specifically, the feed section 48 nests inside the base section 46 such that in the transport position, the infeed conveyor assembly 18 is approximately 40 feet in length. In addition to the infeed conveyor assembly 18 and the discharge conveyor assembly 26, each of the outriggers 56 are also movable to a transport position in which they are rotated upward and away from the ground.

Referring back now to FIGS. 1 and 2, in accordance with the present invention, the feed section 48 of the infeed conveyor assembly 18 includes an inner portion 58 and an outer portion 60. As can be seen in FIGS. 1 and 2, the outer portion 60 can be pivoted relative to the inner portion 58 such that the outer portion 60 can be generally horizontal while the inner portion 58 is inclined and extends along the general longitudinal axis of the base section 46. As can be understood in FIG. 2, when the outer portion 60 of the feed section 48 is pivoted to the generally horizontal position shown, the outer portion 60 can be used to directly unload the dump truck 22 without any other required components, such as an external hopper, a skid steer loader, a front end loader or a coal chute in the dump truck 22.

In prior vehicle-mounted conveyor systems, the entire infeed conveyor assembly is of a fixed length and extends along a longitudinal axis. Thus, the outermost, infeed end of the feed section is positioned at an angle relative to horizontal and additional machinery and an external hopper must be used to aid in unloading the dump truck 22. In accordance with the present invention, the additional machinery and external hopper are not required, since the outer portion 60, including a collapsible collection bin to be discussed below, can be positioned generally horizontal and utilized to unload the dump truck 22.

Figure 4:
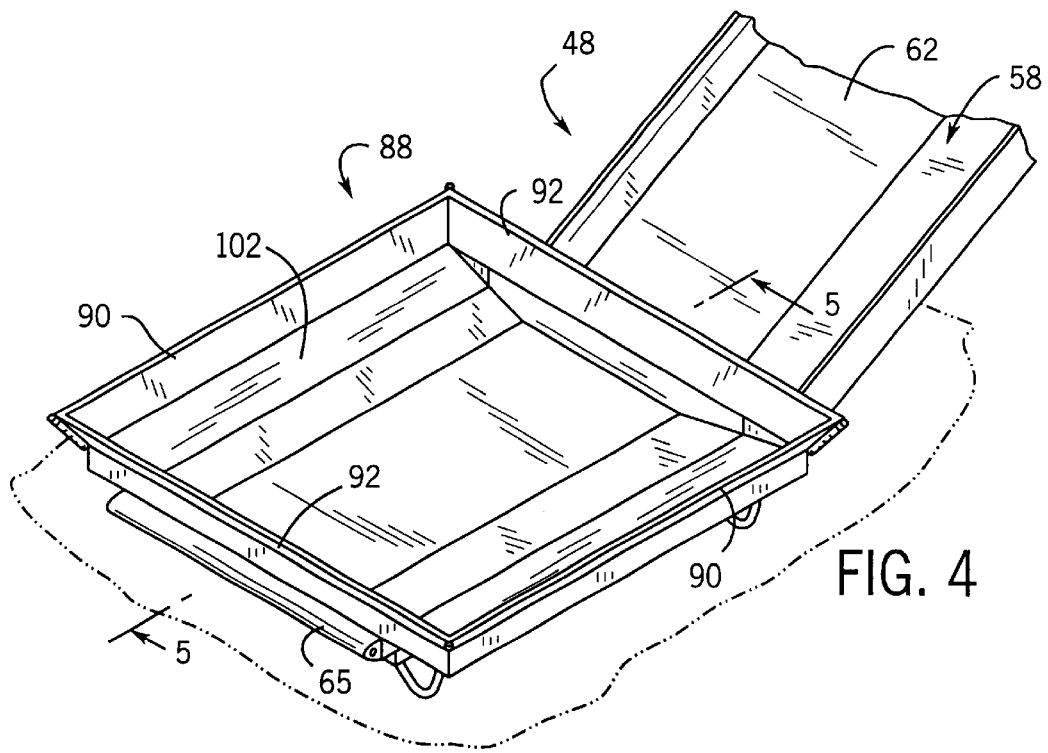
FIG. 4 is a partial perspective view illustrating the collapsible hopper formed on the outer portion of the feed section of the infeed conveyor assembly.
Figure 5:
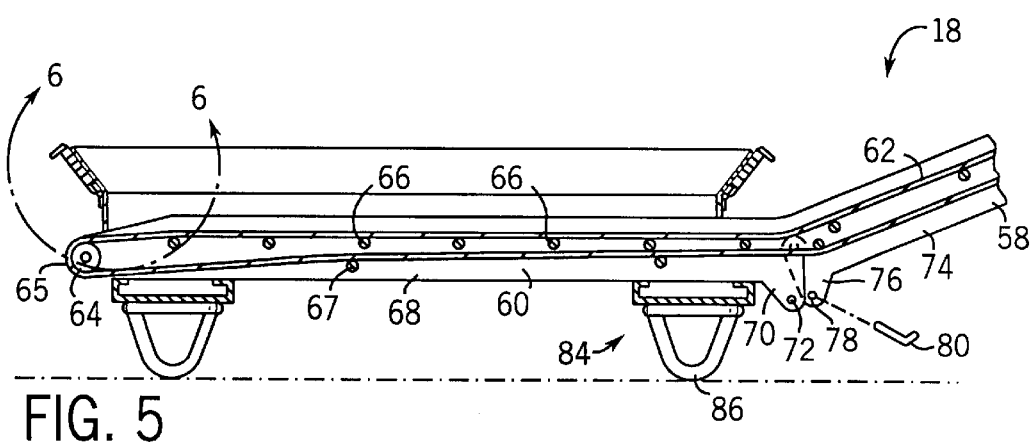
FIG. 5 is a partial section view taken along line 5—5 of FIG. 4 illustrating an endless conveyor belt extending between the outer portion and the inner portion of the feed section of the infeed conveyor assembly.

Referring now to FIGS. 4 and 5, thereshown is a detailed view of the interconnection between the inner portion 58 and the outer portion 60 of the feed section 48 of the infeed conveyor assembly 18. As can be seen in FIGS. 4 and 5, a continuous infeed conveyor belt 62 extends along the combined length of the inner portion 58 and the outer portion 60. The endless infeed conveyor belt 62 extends around an end roller 64 contained on the outermost, infeed end 65 of the outer portion 60 and returns back through the outer portion 58 and extends up into the inner portion 58. The endless conveyor belt 62 is supported by a series of upper guide rollers 66 and lower guide rollers 67. The upper guide rollers 66 provide support for not only the infeed conveyor belt 62, but also the supply of aggregate material unloaded onto the infeed conveyor assembly 18. In the preferred embodiment of the invention, the infeed conveyor belt 62 is flexible such that the outer portion 60 can pivot relative to the inner portion 58 without restriction from the infeed conveyor belt 62.

Referring now to FIG. 5, the outer portion 60 is generally defined by a pair of opposed side rails 68 that define the length of the outer portion 60 and are spaced by a distance slightly larger than the width of the infeed conveyor belt 62. Preferably, the side rails 68 are each formed from aluminum to provide the required strength and low weight for the feed section 48. Each of the side rails 68 defining the outer portion 60 includes a locking flange 70 that extends downward from the side rail 68. The locking flange 70 includes an access hole 72 formed near its outer edge. Like the outer portion 60, the inner portion 58 of the feed section 48 also includes a pair of side rails 74 that extend along the length of the inner portion 58 and are spaced by the general width of the infeed conveyor belt 62. The side rails 74 are also formed from aluminum and each include a depending locking flange 76. Each of the locking flanges 76 include an access hole 78.

Figure 7:
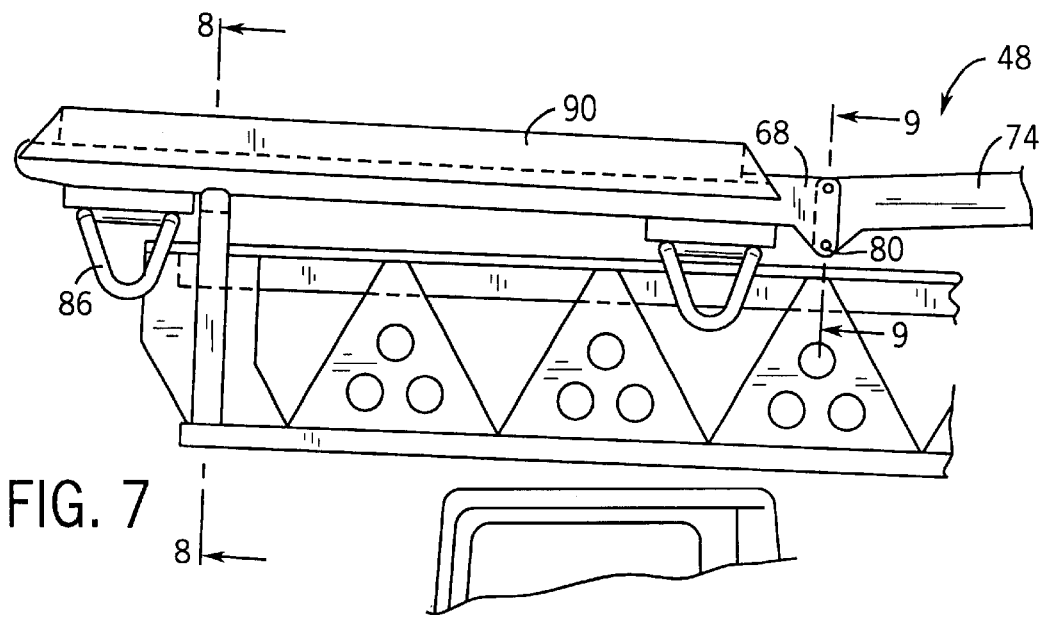
FIG. 7 is an enlarged side view illustrating the outer portion of the feed section of the infeed conveyor assembly in its transporting position.
Figure 9:
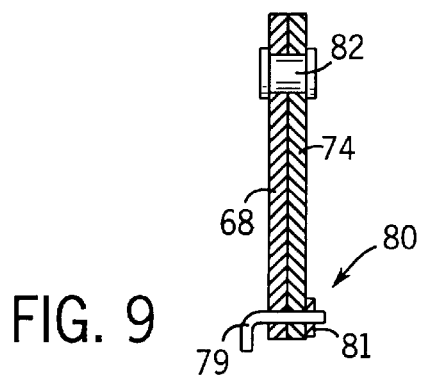
FIG. 9 is a partial section view taken along line 9—9 of FIG. 7 illustrating the mounting arrangement between the inner portion and outer portion of the feed section of the infeed conveyor assembly.

Referring now to FIGS. 7 and 9, when the feed section 48 is in its locked, transport position shown in FIG. 7, a locking member 80 passes through both the access hole 72 formed in the locking flange 70 on the outer portion 60 and the access hole 78 formed in the locking flange 76 of the inner portion 58. In this manner, the locking member 80 secures the outer portion 60 in a position extending along the longitudinal axis defining the entire infeed conveyor assembly 18. When the locking member 80 is positioned between the side rails defining the inner portion 58 and the outer portion 60 of the feed section 48, the inner portion 58 and the outer portion 60 are generally secured in alignment with each other to define a continuous conveyor path along the entire feed section 48. As shown in FIG. 9, in the preferred embodiment of the invention, the locking member 80 is a latch pin 79 including a locking washer 81 attachable to the latch pin 79 to secure the latch pin 79 in place. Alternatively, it is contemplated by the inventor that the locking member 80 could be a cylinder operable to secure the feed section 48 in the locked position and release the feed section 48 to the horizontal position.

Referring back to FIG. 5, when the infeed conveyor assembly 18 is rotated away from the transport position, the feed section 48 can be extended from the base section 46 until the outermost, infeed end 65 of the feed section 48 contacts the ground. Once the infeed end 65 of the feed section 48 contacts the ground, each of the locking members 80 can be removed from between the aligned locking flanges 70 and 76 to permit the outer portion 60 to rotate relative to the inner portion 58. As can be seen in FIG. 9, a pivot pin 82 is positioned between each side rail 68 defining the outer portion 60 and the corresponding side rail 74 defining the inner portion 58. The pivot pins 82 allow the outer portion 60 to pivot relative to the inner portion 58, as illustrated in FIG. 5.

As the outer portion 60 pivots relative to the inner portion 58, a support assembly 84 mounted beneath the outer portion 60 contacts the ground to provide support for the outer portion 60. In the preferred embodiment of the invention, the support assembly 84 includes a pair of feet 86 spaced along the length of the outer portion 60 and secured to the side rails 68. The feet 86 attached to the outer portion 60 provide support for the outer portion 60 along an uneven work surface. In the preferred embodiment of the invention, the overall length of the outer portion 60 is approximately 2–3 meters long and preferably horizontal when in the operating position. When the outer portion 60 is in the horizontal operating position, as shown in FIG. 5, the inner portion 58 preferably extends upward at an angle less than 30° relative to horizontal. The loading angle of the inner portion 58 of the feed section 48 should not exceed 30° in order to prevent the aggregate material from tumbling back down the moving infeed conveyor belt 62 extending along the length of the inner portion 58.

Figure 6:
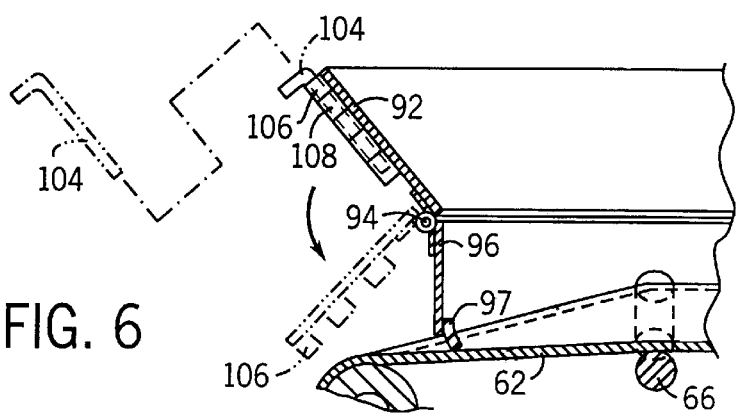
FIG. 6 is a partial section view taken along line 6—6 of FIG. 5 illustrating the mounting arrangement between the sidewalls of the collapsible hopper and the outer portion of the feed section.

Referring now to FIGS. 4 and 5, the outer portion 60 of the feed section 48 preferably includes a collapsible collection bin 88 integrally formed with the outer portion 60. Specifically, the collapsible collection bin 88 includes a pair of spaced sidewalls 90 and a pair of spaced end walls 92, each of which are collapsible from the operating position shown in FIG. 4. Referring now to FIG. 6, each of the end walls 92 is mounted by a hinge 94 to a transverse support wall 96 extending between the pair of spaced side rails 60. The support wall 96 is spaced slightly above the moving infeed conveyor belt 62 and includes a trim strip 97 to prevent aggregate material from passing between the conveyor belt 62 and the support wall 96.

Figure 8:
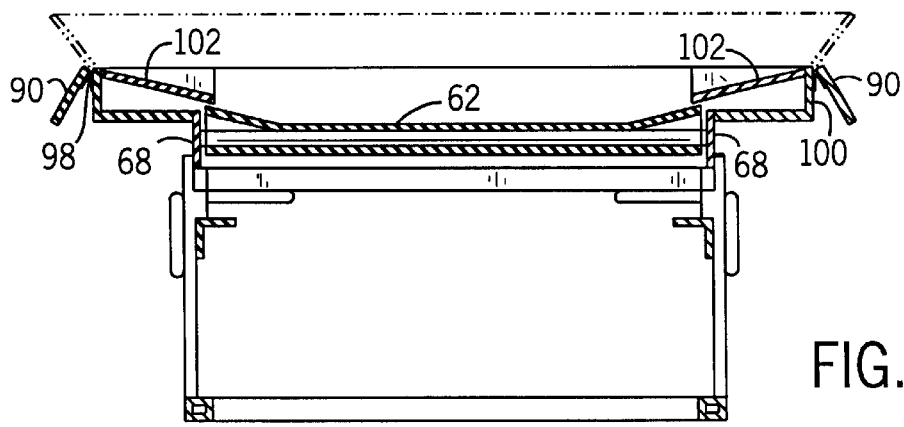
FIG. 8 is a section view taken along line 8—8 of FIG. 7.

As shown in FIG. 8, each of the sidewalls 90 is connected by a hinge 98 to a side support wall 100. The side support wall 100 includes a horizontal portion that is connected to the side rails 68. A sloped guide wall 102 extends from each of the sidewalls 100 to the infeed conveyor belt 62 to aid in directing the supplied aggregate material onto the moving conveyor belt 62.

After the outer portion 60 is supported in its horizontal position as shown in FIG. 5, each of the sidewalls 90 and end walls 92 are folded upward from their storage position to their operating position as shown in FIG. 5. As shown in FIG. 6, a locking pin 104 can be inserted into aligned and mating attachment members 106 and 108 formed on the end wall 92 and sidewall 90. The locking pin 104 secures the end wall 92 to the sidewall 90 such that the entire collapsible collection bin 88 can be secured in its operating position.

As can be understood in FIG. 2, when the collapsible collection bin 88 is constructed and the outer portion 60 is in its horizontal, operating position, the outer portion 60 can be positioned directly behind the dump truck 22. When positioned behind the dump truck 22, the outer portion 60 receives the aggregate material from the dump truck 22 and transports the aggregate material along the length of the infeed conveyor assembly 18. Thus, infeed conveyor assembly 18 can be operated without any external hopper and thus does not need any additional components besides the components transported along with the vehicle.

Various alternatives and embodiments are contemplated as being within the scope of the following claims particularly pointing out and distinctly claiming the subject matter regarded as the invention.

I claim:

1. A self-propelled, vehicle-mounted conveyor system for transporting an aggregate material from a supply source to a remote desired location, the conveyor system comprising:

a discharge conveyor assembly mounted to the vehicle, the discharge conveyor assembly including a telescoping boom extending between an infeed end and a discharge end and a discharge conveyor belt for transporting the aggregate material along the length of the telescoping boom from the infeed end to the discharge end;

an infeed conveyor assembly mounted to the vehicle to transport the aggregate material from the supply source to the infeed end of the telescoping boom, the infeed conveyor assembly extending along a longitudinal axis and comprising:

a base section mounted to the vehicle adjacent to the infeed end of the telescoping boom; and a feed section telescopingly movable into and out of the base section, the feed section including an outer portion pivotally mounted to an inner portion such that the outer portion is selectively positionable at an angle relative to the longitudinal axis of the infeed conveyor assembly, and a collapsible collection bin attached to the outer portion of the feed section, the collection bin including a pair of opposed sidewalls and a pair of opposed end walls, each of the sidewalls and end walls being movable between a collapsed, storage position and an extended, operating position.

2. The conveyor system of claim 1 further comprising a locking member positioned between the outer portion and the inner portion of the feed section, the locking member operable to secure the outer portion in a locked position in which the outer portion generally extends along the longitudinal axis of the infeed conveyor assembly.

3. The conveyor system of claim 2 wherein the locking member is removably positioned between the outer portion and the inner portion of the feed section to permit the outer portion to pivot relative to the inner portion.

4. The conveyor system of claim 2 wherein the inner portion and the outer portion of the feed section each include a depending locking flange, wherein the locking flanges receive the locking member to secure the outer portion in the locked position.

5. The conveyor system of claim 4 wherein the locking member is a pin receivable in aligned mounting holes formed in the locking flanges formed on the outer portion and the inner portion of the feed section.

6. The conveyor system of claim 1 further comprising a support assembly mounted to the outer portion of the feed section to support the outer position along a work surface when the outer portion is positioned at an angle relative to the longitudinal axis of the infeed conveyor assembly.

7. The conveyor system of claim 1 wherein the feed section and the base section include an endless conveyor belt extending along the combined length of the base section and the inner portion and the outer portion of the feed section, the endless conveyor being operable to transport the aggregate material from the supply source to the (discharge) conveyor assembly.

8. The conveyor system of claim 1 wherein each of the sidewalls and end walls of the collection bin include attachment members to secure the sidewalls to the end walls.

9. An infeed conveyor assembly for transporting an aggregate material from a supply source to a discharge conveyor assembly mounted to a self-propelled vehicle for transporting the aggregate material to a remote, desired location, the infeed conveyor assembly comprising:

a base section extending along a longitudinal axis and having a discharge end mounted adjacent to the discharge conveyor assembly; and a feed section telescopingly movable along the longitudinal axis into and out of the base section, the feed section including an outer portion pivotally mounted to an inner portion, the outer portion being selectively positionable at an angle relative to the longitudinal axis, and a collapsible collection bin attached to the outer portion of the feed section, the collection bin including a pair of sidewalls mounted to the outer portion of the feed section and movable between a collapsed, storage position and an extended, operating position.

10. The infeed conveyor assembly of claim 9 further comprising a locking member positioned between the outer portion and the inner portion of the feed section, the locking member being operable to secure the outer portion in a locked position in which the outer portion generally extends parallel to the longitudinal axis.

11. The infeed conveyor assembly of claim 10 wherein the inner portion and the outer portion of the feed section each include a locking flange, the locking flanges receiving the locking member to secure the outer portion in the locked position.

12. The infeed conveyor assembly of claim 11 wherein the locking member is a pin receivable in aligned holes formed in the locking flanges formed on both the outer portion and the inner portion of the feed section.

13. The infeed conveyor assembly of claim 10 wherein the locking member is removable to permit the outer portion to pivot about the inner portion.

14. The infeed conveyor assembly of claim 9 further comprising a support assembly mounted to the outer portion of the feed section to support the outer portion when the outer portion is positioned at an angle relative to the longitudinal axis.

15. The infeed conveyor assembly of claim 9 wherein the feed section further comprises an endless conveyor belt extending along the combined length of the base portion and the outer portion.

16. The infeed conveyor assembly of claim 9 wherein the collapsible collection bin further includes a pair of end walls attached between the pair of opposed sidewalls when the sidewalls are in their extended position, such that the collection bin directs the aggregate material onto a conveyor belt contained in the feed section.

17. In a self-propelled, vehicle-mounted conveyor system having a discharge conveyor assembly including a telescoping boom for transporting an aggregate material to a desired location and an infeed conveyor assembly positioned to transport the aggregate material from a supply source to the discharge conveyor assembly, the infeed conveyor assembly including a base section mounted to the vehicle and a feed section telescopingly movable relative to the base section, the improvement comprising:

an inner portion and an outer portion combining to form the feed section, the outer portion being pivotable relative to the inner portion such that the outer portion is movable between a locked position in which the outer portion is generally parallel to the inner portion and an unlocked position in which the outer portion is positionable at an angle relative to the inner portion; and an endless conveyor belt extending along the combined length of the base section and the inner portion and the outer portion of the feed section to transport the aggregate material along the length of the infeed conveyor assembly, and a collapsible collection bin included on the, outer portion of the feed section, the collection bin including a pair of sidewalls mounted to the base portion and movable between a collapsed, storage position and an extended, operating position.

18. The improvement of claim 17 further comprising a locking member positioned between the outer portion and the inner portion of the feed section, the locking member being operable to secure the outer portion in the locked position and being removable to permit the outer portion to pivot into the unlocked position.

19. The improvement of claim 17 further comprising a support assembly mounted to the outer portion of the feed section to support the outer portion when the outer portion is in the unlocked position and oriented at an angle relative to the inner portion.

20. The improvement of claim 17 wherein the collection bin further includes a pair of end walls removably attached to the opposed sidewalls when the sidewalls are in the extended position.

* * * * *